(12) United States Patent
De Bonet

(10) Patent No.: US 7,031,540 B2
(45) Date of Patent: Apr. 18, 2006

(54) TRANSFORMATION TO INCREASE THE LEMPEL-ZIV COMPRESSIBILITY OF IMAGES WITH MINIMAL VISUAL DISTORTION

(75) Inventor: Jeremy S. De Bonet, N. Andover, MA (US)

(73) Assignee: Mobitv, Inc., Emeryville, CA (US)

( * ) Notice: Subject to any disclaimer, the term of this patent is extended or adjusted under 35 U.S.C. 154(b) by 569 days.

(21) Appl. No.: 10/241,876

(22) Filed: Sep. 12, 2002

(65) Prior Publication Data
US 2003/0048944 A1    Mar. 13, 2003

Related U.S. Application Data

(60) Provisional application No. 60/322,148, filed on Sep. 12, 2001.

(51) Int. Cl.
*G06K 9/46* (2006.01)
*G06K 9/36* (2006.01)

(52) U.S. Cl. .................................. 382/244; 382/166
(58) Field of Classification Search ................ 382/232, 382/235, 236, 244, 166; 375/240
See application file for complete search history.

(56) References Cited

U.S. PATENT DOCUMENTS

| | | | |
|---|---|---|---|
| 5,497,434 A | 3/1996 | Wilson | |
| 5,630,036 A * | 5/1997 | Sonohara et al. | 345/589 |
| 5,825,917 A * | 10/1998 | Suzuki | 382/164 |
| 5,915,077 A * | 6/1999 | Kulkarni et al. | 358/1.9 |
| 6,005,979 A | 12/1999 | Chang et al. | |
| 6,009,192 A * | 12/1999 | Klassen et al. | 382/167 |
| 6,438,270 B1 * | 8/2002 | Harrington | 382/262 |
| 6,525,725 B1 * | 2/2003 | Deering | 345/419 |
| 2001/0054131 A1 * | 12/2001 | Alvarez et al. | 711/105 |
| 2002/0000988 A1 * | 1/2002 | Nelson et al. | 345/443 |

OTHER PUBLICATIONS

M. D'Ornellas, R. Van den Boomgaard and J. Geusebroek, "Morphological Algorithms for Color Image Based on Generic-Programming Approach", International Symposium on Computer Graphics, Image Processing, and Vision, 1998, p. 435 ☐☐.*
International Search Report for PCT/US02/28994.

* cited by examiner

*Primary Examiner*—Wenpeng Chen
*Assistant Examiner*—Utpal Shah
(74) *Attorney, Agent, or Firm*—Sprinkle IP Law Group

(57) ABSTRACT

A transformation system for increasing the compressibility of digital images. In one embodiment, the pixels of a digital image are examined, one at a time. The color of the examined pixel is compared to that of its neighbors. If the difference in color from either of the neighboring pixels is below a threshold, the color of the neighbor that is closer to the color of the examined pixel is copied to the examined pixel. If neither of the neighbors is close enough in color, the color of the examined pixel is unchanged. The pixels are examined in a single pass. After each pixel has been examined, and possibly changed, the compressibility of the image using a dictionary-based technique, such as one of the Lempel-Ziv techniques, is typically improved.

20 Claims, 4 Drawing Sheets

FIG. 2

```
TBool SimplerTransformation(ClrLUTImg &i, int cThr)
{
        int n;
        for (n=i.CPixels()-2; n>=1; n--){
                TReal dR=Dist(i.Color(i.Pxl(n)), i.Color(i.Pxl(n+1)));
                TReal dL=Dist(i.Color(i.Pxl(n)), i.Color(i.Pxl(n-1)));
                if (dR<dL){
                        if (dR<cThr){
                                i.Pxl(n)=i.Pxl(n+1);
                        }
                }
                else if (dL<cThr){
                        i.Pxl(n)=i.Pxl(n-1);
                }
        }

SUCCEED;
}
```

FIG. 4

```
TBool AdvancedTransform(ClrImg &i, int cThr, int L)
{
    int n,dn;

int c=i.CPixels();

for (k=L; k>0; k--){
    for (n=k; n<c-2*k; n+=k){
        TReal dRgt=0;
        TReal dLft=0;

for (dn=0; dn<k; dn++){
            dLft+=Dist(i.Pxl(n+dn-k), i.Pxl(n+dn));
        } for (dn=0; dn<k; dn++){
            dRgt+=Dist(i.Pxl(n+dn+k), i.Pxl(n+dn));
        }

TReal drMin=cThr;
        if (dLft<dRgt){
            if (dLft<cThr){
                for (dn=0; dn<k; dn++){
                    i.Pxl(n+dn)=i.Pxl(n+dn-k);
                }
            }
        }
        else if (dRgt<cThr){
            for (dn=0; dn<k; dn++){
                i.Pxl(n+dn)=i.Pxl(n+dn+k);
            }
        }
    }
    }
    SUCCEED;
}
```

TRANSFORMATION TO INCREASE THE LEMPEL-ZIV COMPRESSIBILITY OF IMAGES WITH MINIMAL VISUAL DISTORTION

This application claims the benefit of Provisional Application No. 60/322,148, filed Sep. 12, 2001.

BACKGROUND OF THE INVENTION

1. Technical Field

This invention generally relates to compressing digital images. More particularly, this invention relates to enhancing dictionary-based image compression techniques, such as the well known Lempel-Ziv algorithms (including LZ77, LZ78, and LZW), in such a way as to increase the compressibility of images while introducing minimal visual distortion.

2. Related Art

Digital image data can be large and expensive to transport and/or store. In order to transmit fewer bytes when transporting a digital image (e.g., over the Web), compression techniques may be used. Compression may be either lossy or lossless. Lossy compression results in an image that is not identical to the original, but resembles the original closely. Lossless compression takes advantage of the statistical redundancy in images to create an image that exactly represents the original, but uses less data.

A methodical understanding of compression (also known as source coding) began with the seminal work of Claude Shannon (1948), in which he laid out the foundations of most of Information Theory. A powerful class of compression techniques, known as dictionary-based techniques, were first described in the work of Ziv and Lempel (1977 and 1978) and later extended by Welch in 1984. These techniques, known commonly as LZ77, LZ78 and LZW, are simple to implement and relatively fast, and they achieve fairly high compression rates. Because of these properties, these techniques have been used in many computer applications.

LZ77 forms the underlying compression technology for the computer programs gzip, zip, PKZip, deflate, and zlib. In addition, LZ77 forms the underlying compression layer used in the PNG graphics format. LZW forms the underlying compression technology for the computer program compress. In addition, LZW forms the underlying compression layer used in the GIF graphics format.

Dictionary-based techniques are based on the assumption that, within a particular data set, groups of values will tend to be repeated. One of the groundbreaking facts proven by Ziv and Lempel (1977) is that for a stationary distribution—data that is generated by the same unchanging process—dictionary-based techniques approach the entropy of the system, and thus achieve the maximum possible compression ratio. This theoretical result only guarantees that maximum compression will be achieved if the data to be compressed is infinitely large. In practice, this is clearly not the case (all data must be finite) as data is limited by many constraints, including storage, memory, and bandwidth. Therefore, the rate at which the technique approaches the entropy of the data is of critical importance.

In practice, the entropy of a dataset will be lower, and dictionary-based compression will usually approach that entropy faster if the data values are chosen from a smaller alphabet (range of values). Because of this, both GIF and PNG formats reduce the number of colors that can be represented within the image, thereby reducing the alphabet of the data to be compressed. Both GIF and PNG formats have an upper bound of 256 colors. With more colors, the LZ77 and LZW techniques require more data than is present in a typical image to achieve reasonable compression ratios.

The process of GIF or PNG encoding an image can be described at a high level by the following steps: reduce the image to 256 or fewer colors; represent the image as a look up table (LUT) of colors and a two-dimensional array of color look up values (color values); store the size of the image; store the look up table; and compress and store the color values using LZW or LZ77.

With these techniques, GIF and PNG encoding techniques can achieve compression ratios between roughly a factor of 2 and a factor of 50.

To further increase the compressibility of images, two techniques are known in the prior art: image resizing and color reduction.

Image resizing is the simple operation of reducing the size of the image and thereby reducing the number of pixels in the image. Image resizing can be done in a number of ways: Subsampling—simply keeping some pixels and throwing away others; Bilinear interpolation—replacing a group of pixels with the weighted average value of the colors in that group; Spline interpolation—replacing a group of pixels with the weighted average value of the colors in that group and in the surrounding region, taking into account the smoothness of the color variation in the original image; Filtering—replacing a group of pixels with a sum value of the colors in that group and in the surrounding region weighted by the values of the particular filter used. Often a Gaussian filter is used in this application.

By reducing the size of the image, fewer pixel values need to be encoded, resulting in a smaller compressed image. However, by reducing the size of the image, image detail is lost, potentially including critical image characteristics.

Because images that are best stored as GIFs or PNGs are often detail-oriented (e.g., icons, diagrams, or drawings), the detail lost due to image resizing is often unacceptable, even for moderate size reductions (e.g., reductions of 30% or less).

Color reduction is the operation of representing the image using fewer colors. Color reduction is already performed in GIF and PNG compression when the image is reduced to 256 colors, typically from a potential set of 16 million colors.

Color reduction improves the compressibility of images by reducing the size of the alphabet—the number of allowable values—that each pixel can take on. Smaller alphabets typically result in longer sets of repeated values in the data, and thus higher compressibility.

Up to a point, color reduction techniques can be quite effective at reducing the size of a compressed image while creating very little visible distortion of the image. However, as the number of colors is decreased, visible distortion increases, regardless of the reduction method used.

To compensate for decreased colors, techniques such as dithering and error diffusion can be used. By filling image regions with patterns of pixels of differing color, the appearance of a larger color set can be approximated. However, the applicability of dithering or error diffusion in a dictionary-based compression scheme is limited, as the patterns of mixed colors tend not to repeat, yielding short dictionary entries and limited compressibility.

BRIEF SUMMARY OF THE INVENTION

The present invention comprises systems and methods for increasing the compressibility of images while introducing minimal visual distortion. The concept underlying the family of techniques disclosed herein is that the compression achievable by a dictionary technique will increase if the length and frequency of common sequences are increased. The invention increases the length and frequency of common sequences by extending the length of sequences of uniform color. By increasing the length of sequences of uniform color, sequences will become self-compressible (i.e., the start of a sequence can be used to compress the rest of the sequence), and longer matches will occur with other sequences of the same color.

In one simple embodiment of the invention, the pixels of an image are examined. Each row of pixels is examined separately. Going from left to right in each row, each pixel (except for the first and last) is compared to the immediately preceding and succeeding pixels in the row. If the color of the pixel is within a threshold distance of the color of the preceding or succeeding pixel, then it is changed to the color of the closer of the preceding and succeeding pixels. After one row of pixels is completed, the next row is examined, until the entire image has been examined.

In another, more complex embodiment of the invention, the pixels of an image are examined in multiple iterations. In this embodiment, blocks of pixels, rather than individual pixels, are examined on all but the last iteration. Color differences are computed for entire blocks of pixels, and the blocks are changed to match the adjacent blocks. That is, the block which is close enough in color is copied to the block being examined. This process is repeated for each row of the image. After each iteration is completed, the block size is reduced by one pixel, and the process is repeated. The block size is reduced, until, on the last iteration, the block size is one pixel, so that the last iteration is the same as the simple method described above.

Another embodiment of the invention may comprise a software application. The software application may be embodied in a computer-readable medium such as a floppy disk, magnetic tape, CD-ROM, DVD-ROM, RAM, ROM, or the like. The computer readable medium contains instructions which are configured to cause a computer to execute a method which is generally as described above. It should be noted that the computer readable medium may comprise a RAM or other memory which forms part of a computer system. The computer system would thereby be enabled to perform a method in accordance with the present disclosure and is believed to be within the scope of the appended claims.

Numerous additional embodiments are also possible.

BRIEF DESCRIPTION OF THE DRAWINGS

Other objects and advantages of the invention may become apparent upon reading the following detailed description and upon reference to the accompanying drawings.

FIG. 2 shows an implementation of the simple transformation of the embodiment of FIG. 1 represented as an algorithm written in the C++ programming language.

FIG. 4 shows an implementation of the advanced transformation of the embodiment of FIG. 3 represented as an algorithm written in the C++ programming language.

Figure 1:
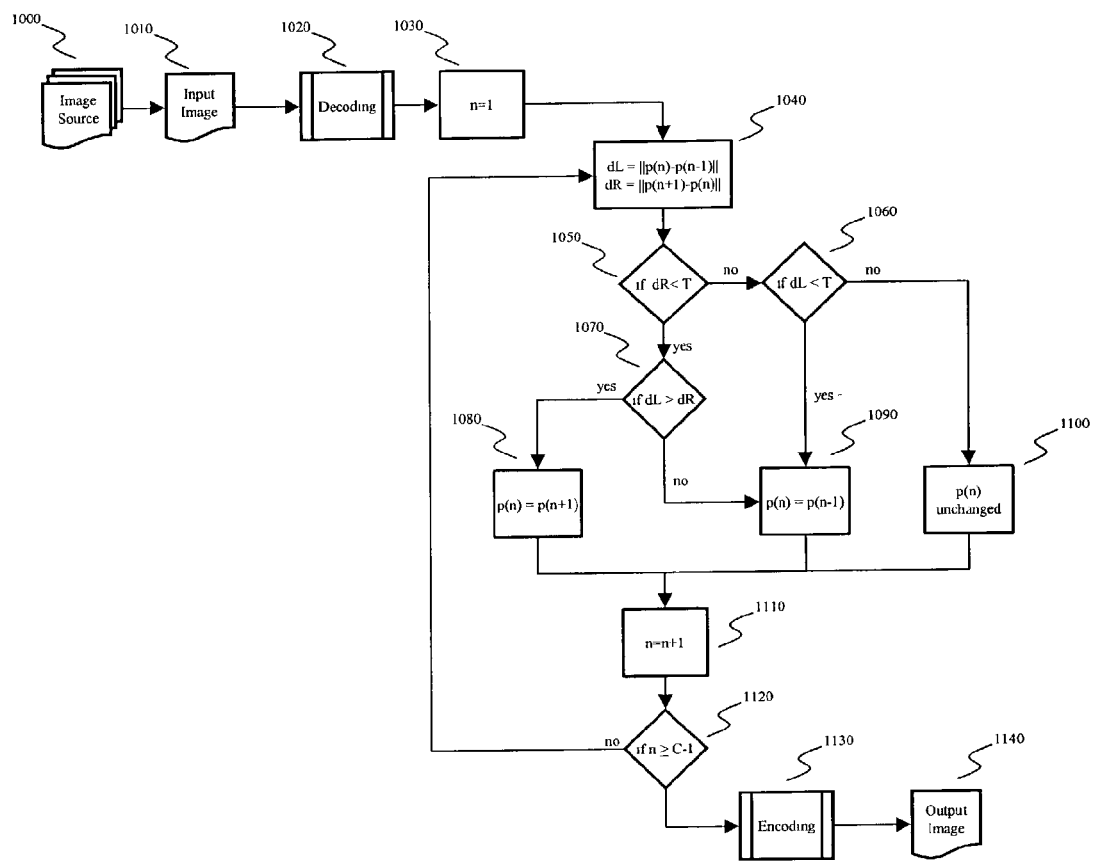
FIG. 1 is a flow diagram illustrating one embodiment of the invention involving a simple transformation of an image.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the present invention as defined by the appended claims.

DETAILED DESCRIPTION OF THE INVENTION

A preferred embodiment of the invention is described below. It should be noted that this and any other embodiments described below are exemplary and are intended to be illustrative of the invention rather than limiting.

Broadly speaking, the invention comprises systems and methods for increasing the compressibility of digital images by examining the pixels of the image and, if the color of a given pixel is close enough to the color of one of its neighbors, the color of the pixel is changed to the color of the neighboring pixel. In this manner, the number of consecutive pixels of the same color is increased, making the image data more compressible with respect to dictionary-based compression techniques Generally, the pixels for an image are examined one by one, working left to right, then top to bottom. For each pixel, it is determined whether the color value of the pixel is within a threshold difference or "distance" of that of either the preceding (left) or succeeding (right) pixel. If the color of the pixel is within this threshold distance of one of these other pixels, the color of the pixel is changed to the closer to that of the preceding pixel or the succeeding pixel. The threshold color distance may be configurable to higher or lower values to ensure that important boundaries and details are not distorted. This methodology can increase the length of runs (consecutive pixels of the same color). At the end of a run, this technique can continue with the color of the preceding pixel. At the beginning of a run, it can change to the color of the succeeding pixel.

Two exemplary embodiments of the present invention comprise methods by which the length of sequences of uniform color can be extended in a digital image, thereby increasing the length and frequency of common sequences, hence the compressibility of the image. The first method is a simpler version of the second, and for many applications is able to achieve the desired compression-distortion tradeoff.

The first method involves a single pass through the image data. Each row is examined separately. Going from left to right in each row, each pixel is compared to the immediately preceding and succeeding pixels in the row. If the color of the pixel is within a threshold distance of the color of the preceding or succeeding pixel, then it is changed to the color of the closer of the preceding and succeeding pixels. After one row of pixels is completed, the next row is examined, until the entire image has been examined.

Referring to FIG. 1, a flow diagram illustrating the first, simple method is shown. In this figure, a compressed input image 1010 is chosen from an image source 1000, for example, a hard drive, digital camera, or web site. The input image is then decoded 1020 using standard dictionary-based image decompression techniques: either GIF or PNG decompression. The resultant image is a look-up-table (LUT) image with 256 or fewer colors, which consists of a color LUT and a two-dimensional array of look-up values. Typically, this LUT image is what is displayed on an end user's device, or the image may be converted into an RGB image.

It should be noted that the original image need not have been previously compressed. The use of a compressed image is merely illustrative of the fact that the image will be processed to increase its compressibility.

The transformation process begins with the initialization of an array index n (1030) that begins at the second pixel (pixel 1 in this instance, because the first pixel is pixel 0). The color referred to at the pixel n is indicated by p(n). At 1040, the color of the pixel p(n) is then compared to the color of the preceding pixel p(n−1) using a norm function. This yields a distance measure dL between the colors of the two pixels. A similar computation is computed between p(n) and the succeeding pixel, p(n+1), yielding distance measure dR. The closeness of the color of the pixel n to its neighbors (n−1 and n+1) can then be determined.

Because dL and dR are only compared to each other and to a threshold T (shown in 1050 and 1060), any distance function can be used, as long as it satisfies the standard mathematical definition of a norm (monotinicity, triangle inequality, and zero-norm). Some of the possible choices are:

the L1 norm:

$$\|\vec{x}\|_1 = \sum |x_i|$$

the L2 norm:

$$\|\vec{x}\|_2 = \sqrt{\sum x_i^2}$$

the L-infinity norm:

$$\|\vec{x}\|_\infty = \sqrt[\infty]{\sum x_i^\infty} = \max x_i$$

In practice, it often is useful to use the L2 norm squared $$\left((\|\vec{x}\|_2)^2 = \sum x_i^2\right)$$

because it can be computed very quickly on most computer architectures (often in one processor cycle). The choice of one norm function over another will result in different lossy approximations, but makes no algorithmic difference.

After dL and dR are computed, dR is compared to T (1050). If dR is less than T, it is then compared to dL (1070). Otherwise, dL is compared to T (1060).

If processing reaches 1070, i.e., dR is less than T, and if dR is less than dL, the look-up value at pixel n+1 is copied into the look-up value at pixel n (1080). Otherwise, the look-up value at pixel n−1 is copied into the look-up value at pixel n (1090).

If processing reaches 1060, i.e., dR is not less than T, and if dL is less than T, the look-up value at pixel n−1 is copied into the look-up value at pixel n (1090). Otherwise, the look-up value at pixel n is left unchanged (1100).

Next, processing the index n is advanced to n+1 (1110). If the new pixel n is not the last pixel in the row (pixel C−1), the process is then repeated at this new pixel location (by returning to 1040). If new pixel n is the last pixel in the row, which is not processed (1120). This procedure is repeated for every row in the image. After each row has been processed, the image is then recompressed (1130) using standard dictionary-based image compression techniques: (e.g., either GIF or PNG compression).

Under most conditions, the new compressed image (1140) is smaller than the original (1010). The additional compression that can be achieved for a given image is controlled by the threshold parameter T. The greater the value of T, the more likely it is that the color of a pixel will be changed to that of an adjacent pixel. It should be remembered, however, that the additional compression is achieved at the expense of additional visual distortion. Thus, T should be chosen to achieve acceptable levels of both compression and visual distortion. Typical increases in compression may be in the range of 25%–35% with very little visible distortion to the image.

It should be noted that the same method can be implemented in a number of ways that vary from the embodiment of FIG. 1. For example, dL may be compared to threshold parameter T before dR is compared to it, or dL may be compared to dR and only the smaller of them might be compared to T to determine whether to change the color of pixel n. Such variations are considered to be equivalent to the described method.

It should be noted that, while the pixels are examined from left to right and from top to bottom in the embodiment described above, this may not be the case in other embodiments. The order of the pixels is determined by the image file format. If the data for two pixels is consecutively stored in the image file, then the two pixels will be considered adjacent (i.e., they will be neighbors) for the purpose of examining them in the context of the described method The transformation method illustrated in FIG. 1 can be represented as an algorithm written in a computer programming language. FIG. 2 shows an implementation of this transformation method written in C++. Again, a number of variations are possible, each resulting in an equivalent implementation.

A second, more advanced embodiment comprises a multiple-iteration version of the simple transformation described above. In this embodiment, blocks of pixels, rather than individual pixels, are examined on the first iteration. Color differences are computed for entire blocks of pixels, and the blocks are changed to match the adjacent blocks. Block color differences are defined in this embodiment to be the sum of the individual differences between corresponding pixels in each block. This process is repeated for each row of the image. This solves the potential problem of not changing small groups of pixels that are very close in color to adjacent pixels. In subsequent iterations, the block size is reduced, until, on the last iteration, the remainder of the method is the same as the simple method described above.

Figure 3:
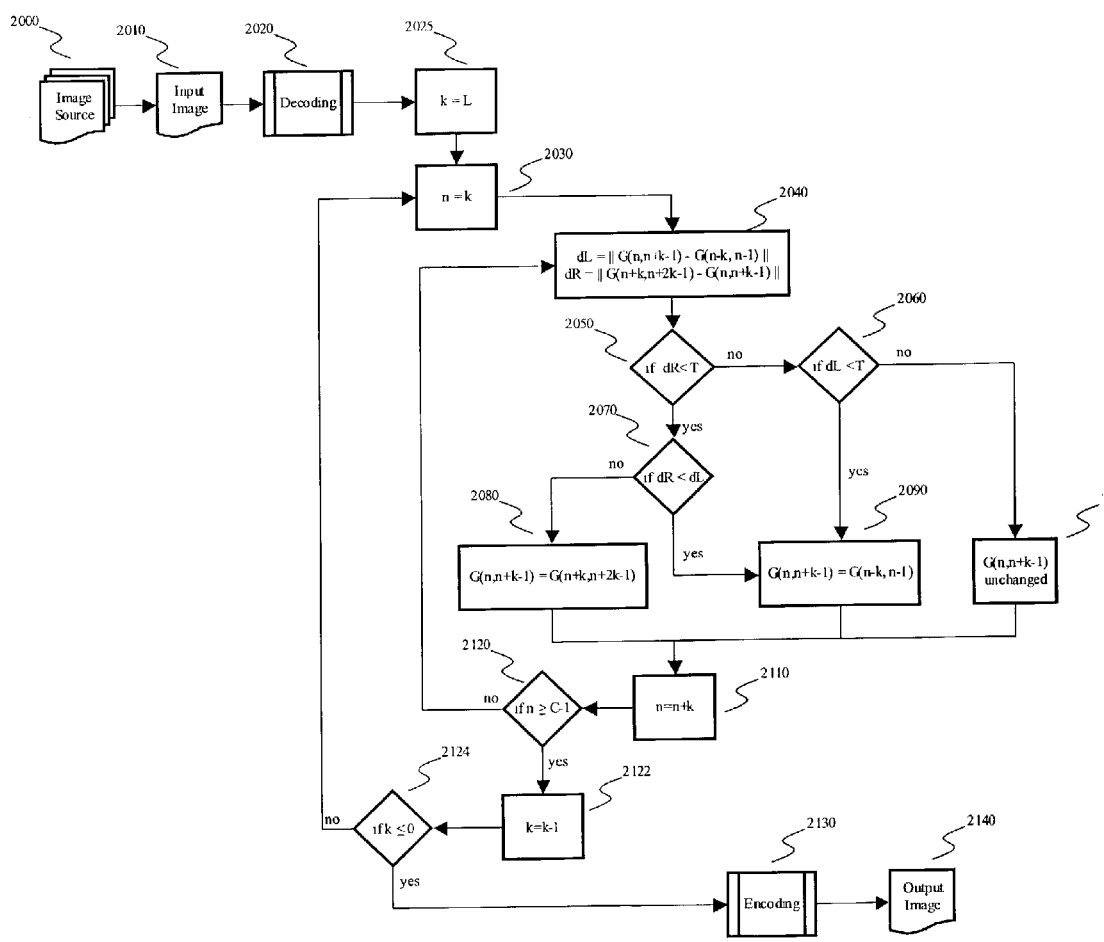
FIG. 3 is a flow diagram illustrating one embodiment of the invention involving an advanced transformation of an image.

FIG. 3 shows a flow diagram illustrating the more advanced method. In this embodiment, multiple passes are taken over the image. Before the first pass, a group size k is initialized to a value L, which is an input parameter. As the index n progresses over the image in steps of size k (2010), groups of pixels of size k to the left and right of the window at n are compared to the size k group at n (2040). In the same way that individual pixels from the left or right were copied in the simple transformation (1080, 1090), in the advanced transformation, the entire window of length k is copied (2080, 2090).

After each pass, the group size k is reduced (2122), and the process is repeated with the smaller group size, until the size reaches 0 (2124), at which point the image is recompressed (2130) using standard dictionary-based image compression techniques such as GIF or PNG compression.

With particular settings of L and T in this more advanced method, greater compression improvements can be achieved at the expense of the additional computation time required to take multiple passes over the image. Unlike with the simple transformation, the advanced transform can, with certain parameters, completely distort the visual appearance of the image in order to achieve exceptionally high levels of compression. However, for some applications these extreme levels of distortion may not be acceptable.

This transformation can be represented as an algorithm written in a computer programming language. FIG. 4 contains an implementation of this transformation written in C++.

It should be noted that the methodologies disclosed herein may be implemented in various combinations of software (including firmware) and hardware. The present application is therefore intended to cover software applications that include instructions for causing a computer or other data processor to perform the methods disclosed herein. These software applications may be embodied in any medium readable by such a computer or data processor, including floppy disks, magnetic tapes, CD-ROMs, DVD-ROMs, RAM, ROM, and the like. Likewise, a computer or data processor which is configured to execute such software applications, or which is otherwise programmed to perform the methods disclosed herein is intended to be covered by the present application.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms 'comprises,' 'comprising,' or any other variations thereof, are intended to be interpreted as non-exclusively including the elements or limitations which follow those terms. Accordingly, a process, method, article, or apparatus that comprises a list of elements does not include only those elements but may include other elements not expressly listed or inherent to the claimed process, method, article, or apparatus.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

What is claimed is:

1. A method for processing an image, comprising:
    examining a series of pixels in blocks of size n; and
    for each block of pixels,
        determining a first difference between the examined block of pixels and the preceding block of pixels,
        determining a second difference between the examined block of pixels and a succeeding block of pixels,
        determining whether either of the first difference or the second difference is less than a threshold difference, and
        if either difference is less than the threshold difference, copying the preceding block of pixels to the examined block of pixels if the first difference is less than the second difference, and copying the succeeding block of pixels to the examined block of pixels if the second difference is less than the first difference, thus generating a modified image with extended length of consecutive pixels of same color and increased compressibility with respect to dictionary-based compression techniques.

2. The method of claim 1, wherein n=1.

3. The method of claim 1, wherein n is greater than 1, wherein the examination of the series of pixels is repeated at least one time, and wherein n is decremented for each successive examination.

4. The method of claim 1, further comprising decompressing the image prior to processing the image.

5. The method of claim 1, further comprising compressing the modified image.

6. The method of claim 5, wherein the compression employs a dictionary-based technique.

7. The method of claim 6, wherein compressing the modified image comprises performing Lempel-Ziv 1977 (LZ77) compression on the modified image.

8. The method of claim 6, wherein compressing the modified image comprises performing Lempel-Ziv 1978 (LZ78) compression on the modified image.

9. The method of claim 6, wherein compressing the modified image comprises performing Lempel-Ziv-Welch (LZW) compression on the modified image.

10. A method for processing an image comprising:
    for each of a plurality of pixels in an image,
        determining whether the color of a pixel is within a threshold distance of the color of a first neighboring pixel, and
        if the color of the pixel is within the threshold distance of the color
        of
            the first neighboring pixel and the color of the pixel is at least as close to the color of the first neighboring pixel as to the color of a second neighboring pixel, changing the color of
        the
            pixel to the color of the first neighboring pixel, thus generating a modified image having extended length of consecutive pixels of same color and increased compressibility with respect to dictionary-based compression techniques.

11. The method of claim 10, further comprising compressing the modified image.

12. The method of claim 11, wherein compressing the modified image comprises performing dictionary-based compression on the modified image.

13. The method of claim 12, wherein compressing the modified image comprises performing Lempel-Ziv 1977 (LZ77) compression on the modified image.

14. The method of claim 12, wherein compressing the modified image comprises performing Lempel-Ziv 1978 (LZ78) compression on the modified image.

15. The method of claim 12, wherein compressing the modified image comprises performing Lempel-Ziv-Welch (LZW) compression on the modified image.

16. The method of claim 10, further comprising decompressing the image prior to examining the pixels.

17. A computer-readable medium embodying computer-executable program instructions of a software program product implementing a method for processing an image, the method comprising:
   examining a series of pixels in blocks of size n; and
   for each block of pixels,
      determining a first difference between the examined block of pixels and the preceding block of pixels,
      determining a second difference between the examined block of pixels and a succeeding block of pixels,
      determining whether either of the first difference or the second difference is less than a threshold difference, and
      if either difference is less than the threshold difference, copying the preceding block of pixels to the examined block of pixels if the first difference is less than the second difference, and copying the succeeding block of pixels to the examined block of pixels if the second difference is less than the first difference, thus generating a modified image with extended length of consecutive pixels of same color and increased compressibility with respect to dictionary-based compression techniques.

18. The computer-readable medium of claim 17, wherein n=1.

19. The computer-readable medium of claim 17, wherein n is greater than 1, wherein the examination of the series of pixels is repeated at least one time, and wherein n is decremented for each successive examination.

20. A computer-readable medium embodying computer-executable program instructions of a software program product implementing a method for processing an image, the method comprising:
   for each of a plurality of pixels in the image,
      determining whether the color of a pixel is within a threshold distance of the color of a first neighboring pixel, and
      if the color of the pixel is within the threshold distance of the color of
         the first neighboring pixel and the color of the pixel is at least as close to the color of the first neighboring pixel as to the color of a second neighboring pixel, changing the color of
      the
         pixel to the color of the first neighboring pixel, thus
      generating a modified image having extended length of consecutive pixels of same color and increased compressibility with respect to dictionary-based compression techniques.

* * * * *